United States Patent Office 3,357,936
Patented Dec. 12, 1967

3,357,936
COATING COMPOSITIONS COMPRISING ALKYD RESINS PREPARED FROM STYRENE-MALEIC ANHYDRIDE COPOLYMERS, POLYOL AND FATTY ACID
Robert L. Zimmerman and Eugene R. Moore, Midland, and Dale M. Pickelman, Auburn, Mich., assignors to The Dow Chemical Company, Midland, Mich., a corporation of Delaware
No Drawing. Filed Feb. 5, 1964, Ser. No. 342,790
16 Claims. (Cl. 260—22)

This invention relates to new polyester coating compositions and is more particularly concerned with novel coatings based on the reaction product of a polyol, a fatty acid, and a monovinylidene aromatic copolymer which contains anhydride groups and has a controlled composition and molecular weight.

It has now been found that by limiting the anhydride content of a vinylidene aromatic copolymer to a range of from more than 10 up to 20, most advantageously from 15 to 20 percent by weight, and limiting the number average molecular weight to less than 10,000, preferably to between 1,000 and 5,000, and most advantageously to less than 1500, reaction products with polyols and fatty acids are obtained which can be successfully cooked by a conventional alkyd process without premature gelation.

The compositions of this invention provide air drying or baking coatings of excellent clarity, flexibility, color, solvent resistance and mar resistance. The products of this invention have good dilutability with mineral spirits and many are fully soluble.

The vinylidene aromatic copolymer which is employed in this invention comprises at least 80 but less than 90 weight percent of a monovinylidene aromatic monomer such as styrene, vinyltoluene, α-methylstyrene, ar-chlorostyrene, or ar-dichlorostyrene and correspondingly, more than 10 up to 20 percent by weight of an α,β-unsaturated cyclic anhydride, e.g. maleic anhydride, chlormaleic anhydride, dichlormaleic anhydride, citraconic anhydride, itaconic anhydride, phenyl maleic anhydride, or aconitic anhydride. Especially desirable are terpolymers of styrene or vinyltoluene and 15–45 weight percent α-methylstyrene with maleic anhydride. The copolymer viscosity (10 weight percent in MEK at 25° C.) is less than 1.7 cps. is preferably in the range of 0.6 to 0.9 cps. and is most advantageously less than 0.7 cps. The copolymer should be homogeneous in composition, that is, at least 90 percent must have an anhydride component composition within a range of 5 percent, and preferably within a range of 2 percent by fractionation analysis. It is preferred that the molecular weight distribution also be relatively uniform, or that the resin contain a minimum of very low molecular weight species ($\overline{M}_n < 1000$). The functionality, (combined anhydride content and molecular weight)

$$F = \frac{fm\overline{M}_n}{49}$$

where in $fm$=fractional weight of anhydride in copolymer, should be less than 20 preferably from 2 to 10 and most advantageously less than 6. The number average molecular weight ($\overline{M}_n$) referred to in the application is that determined by vapor pressure osmometry.

Any of a wide variety of polyols may be employed such as a lower alkylene glycol or polyglycol, glycerol, triethanolamine, pentaerthritol, trimethylolpropane, or similar polyols or mixtures thereof. Particularly advantageously are aromatic resins that function as polyols such as DER 332 epoxy resin (the diglycidyl ether of Bisphenol A), DER 661 epoxy resin (the reaction product of epichlorohydrin and Bisphenol A having an epoxide equivalent weight of 475–575), copolymers of styrene and allyl alcohol, Dow Resin 565 (the reaction product of one mole of Bisphenol A with 2 moles of propylene oxide), ethylene oxide adducts of Bisphenol A and the like, which surprisingly yield alkyds that are fully dilutable with mineral spirits. With liquid epoxy resins, coatings for metal that exhibit improved corrosion resistance are obtained.

The fatty acids which may be employed include the $C_8$-$C_{22}$ fatty acids and especially the unsaturated fatty acids. The preferred acids have from 12 to 18 carbon atoms. Most advantageously the fatty acid is a $C_{18}$ unsaturated acid.

If desired, additional polyacids or anhydrides e.g. phthalic anhydride and maleic anhydride or mixtures thereof may be employed over and above the copolymeric resinous polyanhydride. Maleic anhydride is advantageously used in this way to produce water dilutable or reducible vehicles.

The polyol and fatty acid may be derived from an oil plus polyol by alcoholysis if desired. The oil length should be in the range of 27–75, preferably 50 to 60. This invention makes it possible to formulate to higher oil length than is generally practiced with the styrenated alkyds of the prior art and still achieve desirable hardness and toughness of the vehicle.

A hydroxyl to carboxyl ratio of from 0.6 to 1.60 is possible although the more useful range is from 0.80 to 1.40. The generally preferred ratio is about 1.20.

An esterification catalyst such as p-toluene sulfonic acid may be employed, if desired. The cook can readily be reacted to an acid number of <100, and should be in the range of 50–100 for alkali soluble and water dilutable products. For solvent based coatings the final acid number will generally be less than 20 and preferably less than 10.

Solvent cooking is preferred at temperatures ranging from about 150 to 250° C. When the vinylidene copolymer has a viscosity >0.9 cps., a "diglyceride procedure" should be employed to minimize early gelation. The fatty acid and polyol or oil and polyol are first cooked to the calculated diglyceride composition for glycerol or the equivalent monoalcohol for any other polyol and then the vinylidene copolymer is added and co-reacted. Another useful procedure that can aid in avoiding premature gelation is to mix the vinylidene resin and the fatty acid and heat to >180° C. before adding the polyol. This high temperature tends to reverse the crosslinking reaction of polyol and resinous polyanhydride permitting the fatty acid to participate in the esterification in more favorable competition with the polyanhydride.

For most vinylidene copolymers of less than 0.9 cps. all ingredients can be charged at the start and reacted.

Maleinization (term used herein to denote any of the α,β-unsaturated cyclic anhydrides as defined above) to produce water dilutable systems can be carried out after a preliminary cook of vinylidene resin, polyol and fatty acid (Procedure A). Better film properties and more uniform solubility of the products are achieved, however, by first maleinizing the fatty acid followed by addition of vinylidene resin and polyol and reaction (Procedure B). Alternately, the fatty acid can be maleinized, the polyol added and cooked to a desired acid number and then the vinylidene resin added and reacted (Procedure C).

Although phthalic anhydride or other polyanhydrides or polyacids beside maleic anhydride can be employed as indicated above, it should be emphasized that this is not required and is generally not preferred except for water dilutable vehicles because it tends to sacrifice oil length and produce softer coatings having less desirable properties.

Reactive curing agents such as melamine or urea formaldehyde resins may be used with the alkyds of the present invention for baking enamel vehicles having excellent properties.

The invention is further illustrated by the following examples wherein all parts are by weight unless otherwise specified. The copolymers employed in the following examples were prepared by the method of copending application Ser. No. 33,376 filed June 2, 1960, Zimmerman et al., now U.S. Patent 3,336,267.

*Example 1*

An alkyd resin for use in a coating composition using a homogeneous styrene/maleic anhydride copolymer and a diglyceride of dehydrated castor oil fatty acid (DCOFA) was prepared in the following manner.

The oil length=50 and the stoichiometry of total OH/total COOH=1.20.

*Example 3*

Following the procedure of Example 2, 100 grams of a copolymer of styrene, 15.1 percent MA and 35 percent α-MS having a 10 weight percent solution viscosity in MEK at 25° C. of 0.677 cps. ($\overline{M}_n$=1420; F=4.4) was heated with 131 grams TOFA and 28.6 grams glycerol for 18 hours at about 225° C. 9.9 cc. of water was removed and the A.N.=13.0. The product was fully dilutable with mineral spirits. The oil length was 54, the ratio of total OH/total COOH was 1.20. A 1 mil film, baked at 175° C. for 30 minutes passed a conical bend test without failure, passed a front impact of 20 in.-lbs. and a reverse impact of 8 in.-lbs.

Following the above procedure the following compositions were prepared and tested, with the results as indicated.

| Percent MA | Visc. | FA (g.) | Gly. (g.) | OH/COOH Ratio | O.L. | Time | H₂O | A.N. | F.I., in.-lbs. | R.I., in.-lbs. | Conical Bend | KHN |
|---|---|---|---|---|---|---|---|---|---|---|---|---|
| 16.3 | .746 | 142 | 31.0 | 1.2 | 56 | 12.5 | 10.9 | 16.3 | P₉₀ | P₉₀ | P | 30.8 |
| 19.1 | .750 | 144 | 36.3 | 1.3 | 56 | 8.0 | 11.5 | 20.3 | P₉₀ | P₉₀ | P | 27.6 |
| 19.1 | .750 | 126 | 36.3 | 1.4 | 52 | 6.0 | 10.3 | 23.5 | P₉₀ | P₉₀ | P | 32.3 |

A mixture of:

|  | G. |
|---|---|
| 82.7/17.3 styrene/maleic anhydride copolymer (10 percent solution visc. in MEK at 25° C.=1.43 cps.) | 200 |
| Diglyceride of DCO (DCOFA+Glycerol—cooked to A.N.=6) | 445 |
| SC 150, a mixture of alkylbenzenes b. >200° C. (Azeotroping solvent) | 95 | was heated to 213–220° C. in a 2 liter kettle equipped with stirrer, N₂ bubbling tube, and sampling tube. Three samples were taken before the gel point was reached. Each sample was diluted to 35–45 percent solids with a mixture of xylol/MIBK at 1/1 by volume. The solutions were catalyzed so that the concentration of heavy metal driers based on resin solids were 0.06 percent Pb, 0.02 percent Mn, and 0.02 percent Co. Films cast on 10 mil tin plate panels were dried at room temperature and 60° C. for three days.

| Sample No. | Reaction (hr.) | A.N. | Ml. H₂O Off | 3-Day Cure | ¼″ Mandrel Bend | Rev. Impact, in.-lbs. |
|---|---|---|---|---|---|---|
| 1 | 2.7 | 32.9 | 0.8 | R.T., 60° C. | Passed | P₉₀ |
| 2 | 3.3 | 31.9 | 1.0 | R.T., 60° C. | do | P₉₀ |
| 3 | 3.7 | 29.1 | 1.6 | R.T., 60° C. | do | P₉₀ |

*Example 2*

An alkyd resin for use in a coating composition using a homogeneous styrene/maleic anhydride copolymer, tall oil fatty acid (TOFA) and glycerol was prepared in the following manner. A mixture of: 100 g. of a 89.1/10.9 S/MA copolymer $\overline{M}_n$=2050, F=4.6, having a 10 weight percent solution viscosity in MEK at 25° C. of 0.86 cps.+92.5 g. TOFA (Acintol FA 3)+20 g. glycerol+0.2 g. p-TSA+15 ml. SC 150 was heated to 210–224° C. for 1.5 hours; 9.3 ml. H₂O were removed and the A.N.=21. The product was mineral spirits soluble. It was let down with xylol to 68.7 percent solids. The film was clear after one hour at 140° C. under vacuum.

*Example 4*

A water dilutable alkyd resin for use in a coating composition using a homogeneous styrene/maleic anhydride copolymer, fatty acid, polyol and maleic anhydride for maleinization of the FA (fatty acid) was prepared in the following manner. A mixture of:

|  | G. |
|---|---|
| 89.1/10.9 S/MA copolymer (10 percent sol. visc. in MEK at 25° C.=0.86 cps.) | 100 |
| TOFA (Acintol FA 3) | 128 |
| Glycerol | 20 |
| p-TSA | 0.25 |
| Toluene | 5 | was heated to 260° C. for 5 hr. during which 11.0 ml. H₂O was removed and the A.N. reduced to 16, cooled to 200° C. and added:

|  | G. |
|---|---|
| Maleic anhydride | 20 |
| Iodine crystal | 0.3 | and cooking continued for 2½ hrs. at 190–220° C. The A.N. was 57 (Alc. KOH determination) and 110 g. ethylene glycol butyl ether (45 percent based on resin solids), water and NH₄OH were added to give a 35 percent solids solution having a pH in the range of 8–9. Devolatilized film properties were checked and clear tack-free films resulted.

*Example 5*

Following the procedure of Example 4 a mixture of

|  | G. |
|---|---|
| 80.16/19.8 S/MA copolymer (10 percent sol.visc. MEK=1.42; $\overline{M}_n$=3570; F=14.5) | 100 |
| TOFA/PO adduct (A.N.=54) | 110 |
| p-TSA | 0.25 |
| Toluene | 5 | was heated to 260° C. in 5 hours and 4 ml. H₂O phase removed. The A.N. was 44. Cooled to 200° C. and added 18 grams MA and 0.3 g. iodine crystals. Cooking was continued for 2½ hours at 190–220° C. Ethylene glycol butyl ether, water and NH₄OH were added to give a 33.5 percent solids solution having a pH in the range of 9–10. Devolatilized films were clear and tack-free. The TOFA/PO adduct was prepared by coreacting about equal moles of propylene oxide and tall oil fatty acid in the presence of dry Dowex 1–X8 ion exchange resin (chloride form, 200–400 mesh) overnight at 80° C. in a sealed tube.

*Example 6 (Maleinization procedure B)*

A water-based alkyd resin for use in a coating composition using a homogeneous styrene/α-methylstyrene/maleic anhydride terpolymer ($\bar{M}_n$=1960; F=6.6), fatty acid, polyol and maleic anhydride for maleinization of the FA was prepared in the following manner. A mixture of:

|  | G. |
|---|---|
| Soya fatty acids | 94.4 |
| Maleic anhydride | 15.1 |
| Iodine crystal | 0.25 |
| Toluene | 6.6 | was heated to 200° C. and held between 200–208° C. for 2 hrs.

100 grams of a terpolymer of styrene with 16.5 weight percent of maleic anhydride and 19.0 weight percent of α-methyl styrene having a viscosity at 25° C. of 0.876 cps. and 0.25 g. of p-TSA were added and heated to 233° C. when 34.9 of diethylene glycol was added and cooked for 1.3 hr. in a temperature range of 211–280° C. water, 7.8 ml., was removed. The A.N. was 48.5 and the oil length 46, R=0.686. Then ethylene glycol monobutyl ether (45 percent based on resin) and aqueuous ammonia were added diluting to ~35 percent at pH 8–9. Tall oil fatty acid can be substituted for soya and propylene glycol or glycerine can be substituted for diethylene glycol. The physical properties of the clear films were checked on steel panels coated with iron phosphate at 50–120 mg. per sq. ft. of surface area coated using a catalyst concentration of 0.475 weight percent of 6 percent cobalt cyclodex based on resin solids. Films were allowed to air dry and baked (1 hr. at 140° C.). They were cast from a 35 percent solids solution with a No. 42 wire wound Meyer rod. Tackiness was checking by placing a weight on tissue paper exposed to the film, then removing the weight and tissue rapidly. The remaining, if any, tissue indicated the degree of tackiness. Reverse impact was measured in in.-lbs. without crazing of the film. The xylol resistance was indicated by rubbing the film back and forth 20 times with a saturated tissue. After air drying for 30 days the films were tack-free and passed a reverse impact of 90 in.-lbs. Similar results were observed after air drying and then baking at 140° C.

*Example 7*

Following the procedure of Example 6, a coating composition was prepared employing a polymer of styrene, α-methylstyrene (43 percent) and maleic anhydride (19.1 percent) which had a viscosity of 0.750 cps. 110.3 grams of tall oil fatty acid was employed instead of soya and 36.3 grams of glycerol. The oil length was 46; R=1.026; final A.N. was 68.6. Air dried films were tack-free and passed a reverse impact of 90 in.-lb.

*Example 8 (Maleinization procedure C)*

A water based alkyd resin for use in a coating composition using a homogeneous styrene/α-methylstyrene/maleic anhydride terpolymer, fatty acid, polyol and maleic anhydride for maleinization of the fatty acid was prepared in the following manner. A mixture of:

|  | G. |
|---|---|
| Tall oil fatty acid (Acintol FA 3) | 95.6 |
| Maleic anhydride | 15.3 |
| Iodine crystal | 0.22 |
| Benzene | 4.3 | was heated to 200–214° C. and held for 2 hrs. Then added 20.9 g. of ethylene glycol and the temperature held at 150–190° C. until 26 ml. H₂O was removed.

100 grams of the terpolymer employed in Example 6 and 0.22 grams of p-TSA were added and heating continued at 211–250° C. A total 7.6 ml. H₂O was removed in 0.5 hr. A.N. 59.3 (Alc. KOH). The reaction mixture cooled down and ethylene glycol monobutyl ether (45 percent based on resin solids) and aqueous ammonia were added diluting to ~35 percent solids at pH of 8–9. Air dried films (14 days) were tack free and passed a reverse impact of 90 in.-lbs.

*Example 9*

An oil based alkyd resin for use in a coating composition using a homogeneous styrene/α-methylstyrene/maleic anhydride terpolymer, fatty acid and polyol was prepared in the following manner. A mixture of:

S/αMS/MA—14.1 wt. percent MA, 21 percent αMS
Visc. at 25° C.: was 0.833 cps., 100 g.

162 grams TOFA (Acintol FA 3) and 8.7 grams toluene was heated to 242° C. The following ingredients were then added:

|  | G. |
|---|---|
| Glycerol | 26.7 |
| p-TSA | 0.3 | and cooking was continued from 210–250° C. for 2 hrs. removing 12.2 ml. H₂O. The A.N. was 15.1. The reaction mixture was cooled down and diluted with xylol to 50 percent solids. A clear viscous solution resulted Films were cast from a 35 percent solids solution with a No. 42 wound rod on a Bonderite 1000. Heavy metal naphthanates were used as the driers having a concentration based on resin solids of 0.06 percent Pb, 0.02 percent Mn, and 0.02 percent Co. Films dried for 5 days at room temperature, or 10 minutes at 175° C. passed a reverse impact of 90 in.-lbs. Resimene 882 (butylated melamine formaldehyde) and Cymel 300 (hexamethylether of hexamethylol melamine) when co-cured with the above alkyd showed improved solvent and mar resistance and excellent flexibility.

*Example 10*

Oil based alkyd resins for use in a coating composition using a homogeneous styrene/α-methylstyrene/maleic anhydride terpolymer, fatty acid, and polyol were prepared in the following manner:

(1) Heat the polymeric anhydride (S/αMS/MA), 100 grams, fatty acid, azeotroping solvent to 200° C.
(2) Add the polyol or polymeric polyol and catalyst if indicated.
(3) Cook until visc. build is sufficient.
(4) Dilute with solvent to 50 percent solids.
(5) A.N. determined by an Alc. KOH titration in pyridine with thymol blue indicator.

Physical properties of the baked films (½ hr. at 175° C. with drier concentration based on resin of 0.06 percent Pb, 0.02 percent Mn, 0.02 percent Co) were checked on Bonderite 1000 panels, cast from 35 percent solids with No. 42 wire wound rod. The impact, flexibility and hardness were checked with standard procedures. The xylol resistance was checked by a saturated tissue rub test. The Knoop Hardness Number (KHN) was measured on a Kentron Hardness Tester with 10× magnification.

| Sample | Wt. | Composition of MA Polymers | | | | | Physical Proper., Drier Conc. Based on Res., .06 percent Pb, .02 percent Mn, .02 percent Co (Cook ½ hr. 175° C.) | | | | | | | | | |
|---|---|---|---|---|---|---|---|---|---|---|---|---|---|---|---|---|
| | Percent αMS | Percent MA | 10 (cps.) MEK | Fatty Acid (gm.) | Polyol (gm.) | $R = \frac{(OH)^\circ}{(COOH)^\circ}$ | O.L. | Cat. | Temp., °C. | Time (hr.) | Ml. H$_2$O Off | A.N. | F.I. | Conical Bend | Xylol Resistance | KHN |
| 1 | 39 | 10.5 | 0.701 | TO 142 | DER 332 epoxy resin 71.1. | 1.20 | 48 | Yes, p-TSA. | 200-253 | 24 | 4.3 | 10.6 | P$_{90}$ | P | Good | 11.4 |
| 2 | 39 | 10.5 | 0.701 | TO 242 | DER 661 epoxy resin 194. | 1.20 | 48 | Yes, p-TSA. | 200-255 | 5 | 9.6 | 13.5 | P$_{90}$ | P | ...do... | 17.9 |
| 3 | 39 | 10.5 | 0.701 | TO 90.8 | Gly 19.9 | 1.20 | 46 | No | 207-250 | 12 | 6.6 | 10.6 | P$_{11}$ | F craze | ...do... | 19.5 |
| 4 | 39 | 10.7 | ¹ 0.752 | TO 92.5 | Gly 20.3 | 1.20 | 47 | No | 200-210 | 8 | 7.0 | 16.5 | P$_9$ | P | ...do... | 23.1 |
| 5 | 39 | 10.5 | 0.701 | TO 242 | RJ 100,³ 321. | 1.00 | 39 | Yes, p-TSA. | 200-240 | 25 | 17.6 | 9.05 | P$_8$ | F craze | ...do... | 28.9 |
| 6 | 39 | 10.5 | 0.701 | DCO 60.0 PA 20.0 ² | Gly 13.25 EG 11.5 ⁴ | 1.065 | 41 | No | 190-240 | 18 | 6.4 | 12.1 | P$_{14}$ | F craze | Fair | 7.3 |

¹ The copolymer employed in Sample 4 was fractionated to remove low molecular weight species, i.e., chains having a molecular weight of less than 1,000. The $\bar{M}_M$ was 3,880; F=8.5.
² Phthalic anhydride.
³ RJ 100 is a copolymer of about 80 weight percent styrene and 20 weight percent allyl alcohol having a molecular weight of about 1,600.
⁴ Ethylene glycol.

In Sample 6 only 56.1 grams of the copolymer were employed.

*Example 11*

The cooked product of Sample 1 from Example 10, 39.8 grams, was dissolved at 50.4 percent solids in xylene. Fifty grams of a mixture of 28.5 parts of Fe$_2$O$_3$, 28.5 parts of ASP-400 clay pigment and 43.0 parts of barium sulfate were added. The mixture was ground in a porcelain ball mill overnight, cut with 50 grams of SC 150, and driers added to 0.06 percent Pb, 0.02 percent Mn and 0.02 percent Co (based on resin). One mil films were cast on Bonderite 1000, baked at 175° C. for ½ hour and exposed in a salt fog cabinet for 250 hrs. (Spray of salt fog at 100° F. temperatures.) The films remained intact. Failures up to 1/32 at the scribe line were observed.

Various modifications may be made in the present invention without departing from the spirit or scope thereof, and it is understood that we limit ourselves only as defined in the appended claims.

We claim:

1. Coating composition comprising the reaction product of (A) a vinylidene aromatic copolymer having more than 10 up to 20 weight percent of an α,β-unsaturated cyclic anhydride and a number average molecular weight of less than 10,000, at least 90 percent of said copolymer having an anhydride component composition within a range of 5 percent by fractionation analysis, (B) a polyol and (C) a fatty acid in a proportion such that the hydroxyl to carboxyl ratio is from 0.6 to 1.6.

2. Composition of claim 1 wherein the aromatic copolymer has a viscosity, 10 percent in methyl ethyl ketone at 25° C., of less than 1.7 cps.

3. Composition of claim 2 wherein the viscosity is from 0.6 to 0.9 cps.

4. Composition of claim 1 wherein the copolymer is a copolymer of styrene and maleic anhydride.

5. Composition of claim 1 wherein the polymer is a terpolymer of α-methylstyrene, a second and different vinylidine aromatic compound and maleic anhydride.

6. Composition of claim 1 wherein the polyol is an aromatic resinous polyol.

7. Composition of claim 6 wherein the polyol is an epoxy resin.

8. Composition of claim 1 wherein the functionality, $$F = \frac{fmMn}{49}$$

wherein $fm$=fractional weight of anhydride in the copolymer, is less than 20.

9. Composition of claim 8 wherein the functionality, $$F = \frac{fmMn}{49}$$

wherein $fm$=fractional weight of anhydride in the copolymer, is from 2 to 10.

10. Composition of claim 6 wherein the polyol is a copolymer of styrene and allyl alcohol.

11. Composition of claim 1 wherein the fatty acid has from 8 to 22 carbon atoms.

12. Composition of claim 11 wherein the fatty acid is an unsaturated acid having 18 carbon atoms.

13. Composition of claim 1 wherein the oil length is from 25 to 75.

14. Composition of claim 1 which has been maleinized to an acid number of from 50 to 100.

15. Composition of claim 14 which contains water and ethylene glycol monobutyl ether as a cosolvent.

16. Article coated with a tightly adhering dried coating of the composition of claim 1.

References Cited

UNITED STATES PATENTS

| 2,537,949 | 1/1951 | Adams | 260—22 |
| 2,500,765 | 3/1950 | Montague | 260—18 |
| 2,561,313 | 7/1951 | Malinowski | 260—23 |
| 2,820,711 | 1/1958 | Kiebler et al. | 260—18 |
| 2,940,946 | 6/1960 | Shokal et al. | 260—23 |
| 3,066,108 | 11/1962 | Broadhead | 260—22 |
| 3,085,986 | 4/1963 | Muskat | 260—23 |
| 3,098,834 | 7/1963 | Jerabek | 260—23.7 |
| 3,139,411 | 6/1964 | Brockman et al. | 260—22 |
| 3,194,774 | 7/1965 | Nichols | 260—22 |
| 3,313,755 | 4/1967 | O'Rourke | 260—28.5 |
| 3,321,424 | 5/1967 | Imes et al. | 260—23 |

OTHER REFERENCES

Payne: "Organic Coating Technology," vol. I, 1954, pp. 20–24.

Chatfield: "Varnish Constituents," 1953, p. 270.

DONALD E. CZAJA, *Primary Examiner.*

LEON BERCOVITZ, *Examiner.*

R. WHITE, *Assistant Examiner.*